United States Patent [19]
Parry

[11] 3,808,080
[45] Apr. 30, 1974

[54] ULTRASONIC SEAMING APPARATUS
[75] Inventor: Frank Parry, Monroe, Conn.
[73] Assignee: Bronson Instruments, Incorporated, Stamford, Conn.
[22] Filed: June 8, 1972
[21] Appl. No.: 261,058

[52] U.S. Cl. ............................................. 156/580
[51] Int. Cl. ........................................... B32b 31/16
[58] Field of Search ............................. 156/73, 580

[56] References Cited
UNITED STATES PATENTS
3,666,599  5/1974  Obeda ................................ 156/580
3,734,805  5/1973  Obeda et al. ...................... 156/580

Primary Examiner—Douglas J. Drummond
Attorney, Agent, or Firm—Ervin B. Steinberg

[57] ABSTRACT

An ultrasonic seaming apparatus for flexible sheet material includes an ultrasonically vibrating horn and an opposed anvil disk which undergoes adjustable four-motion feed. The disk has different embossings on its peripheral surface and can be indexed about its axis in order to provide selectively for different weld patterns. The adjustable feed controls the quantity of welded spots per unit of seam length.

7 Claims, 5 Drawing Figures

ULTRASONIC SEAMING APPARATUS

CROSS REFERENCES TO RELATED PATENT AND PATENT APPLICATIONS

This invention is related to ultrasonic seaming apparatus of the sewing maching type as disclosed in U.S. Pat. No. 3,666,599 entitled "Sonic or Ultrasonic Seaming Apparatus" in the name of Edward G. Obeda dated May 30, 1972 and to copending application Ser. No. 166,462 entitled "Ultrasonic Sewing Machine" filed in the name of Edward G. Obeda et al. on July 27, 1971 now U.S. Pat. No. 3,734,805.

BRIEF SUMMARY OF THE INVENTION

This application pertains to ultrasonic seaming apparatus in which flexible sheet material made entirely or partially of thermoplastic constituents is seamed or welded by being fed between a stationary or a rotating anvil means and an ultrasonically vibrating tool, also known as resonator or horn. The horn imparts ultrasonic energy to the workpiece as the latter is conveyed, supported by the anvil means, past the frontal surface of the horn, thus causing a weld or fused area. The peripheral surface of a rotating anvil wheel or disk may be embossed so as to produce a seam which incorporates an ornamental design for providing a pleasing appearance. Such a design, for instance, may be in the form of an interrupted line, spaced geometrical figures, spaced chevrons, a zig-zag line, fanciful decoration, etc., see FIG. 3 of the above stated patent.

In many instances the prior seaming arrangements have not been entirely satisfactory. Under certain conditions the material appears to pile up in front of the ultrasonically vibrating horn as the feed mechanism, either the anvil means or separate feed means, attempt to feed the workpiece through the gap between the anvil and the horn. An attempt to remedy this situation is shown in U.S. Pat. No. 3,445,307 dated May 20, 1969 which discloses a construction for cyclically lifting the anvil away from the workpiece by means of an eccentric cam. However, this arrangement lacks flexibility, requires separate material feed means and has other disadvantages which will be more readily apparent from the following description. Furthermore, in order to change the appearance of the weld seam different anvil means are required.

The anvil mechanism disclosed hereinafter includes a disk which is equipped along its peripheral surface with a plurality of distinct ornamental embossings. By means of indexing means each of such embossings can selectively be positioned to cooperate with the ultrasonically vibrating horn to provide for a rapid and most convenient change of embossing pattern. This disk obviates the need for different anvil wheels whenever a pattern change is desired as has been the case in the heretofore known devices. Furthermore, in accordance with the present invention, the anvil disk is mounted to a structure which undergoes a cyclic four-motion feed as is well known from the conventional sewing machine art and, by adjustment means well known in the art, this four-motion feed can be regulated to exhibit variable feed lengths. Therefore, the workpiece fed per unit of time past the frontal surface of the horn is subject to adjustment whereby to achieve a variable weld density, that is, the quantity of welded areas per unit of seam length is adjustable. Last but not least, the four-motion feed cyclically releases the workpiece from intimate engagement between the anvil means and horn and thereby overcomes the bunching of material in front of the horn.

Further and still other salient features of the present invention will be more clearly apparent by reference to the following description when taken in conjunction with the accompanying drawing.

DETAILED DESCRIPTION OF THE PREFERRED EMBODIMENT

Figure 1:
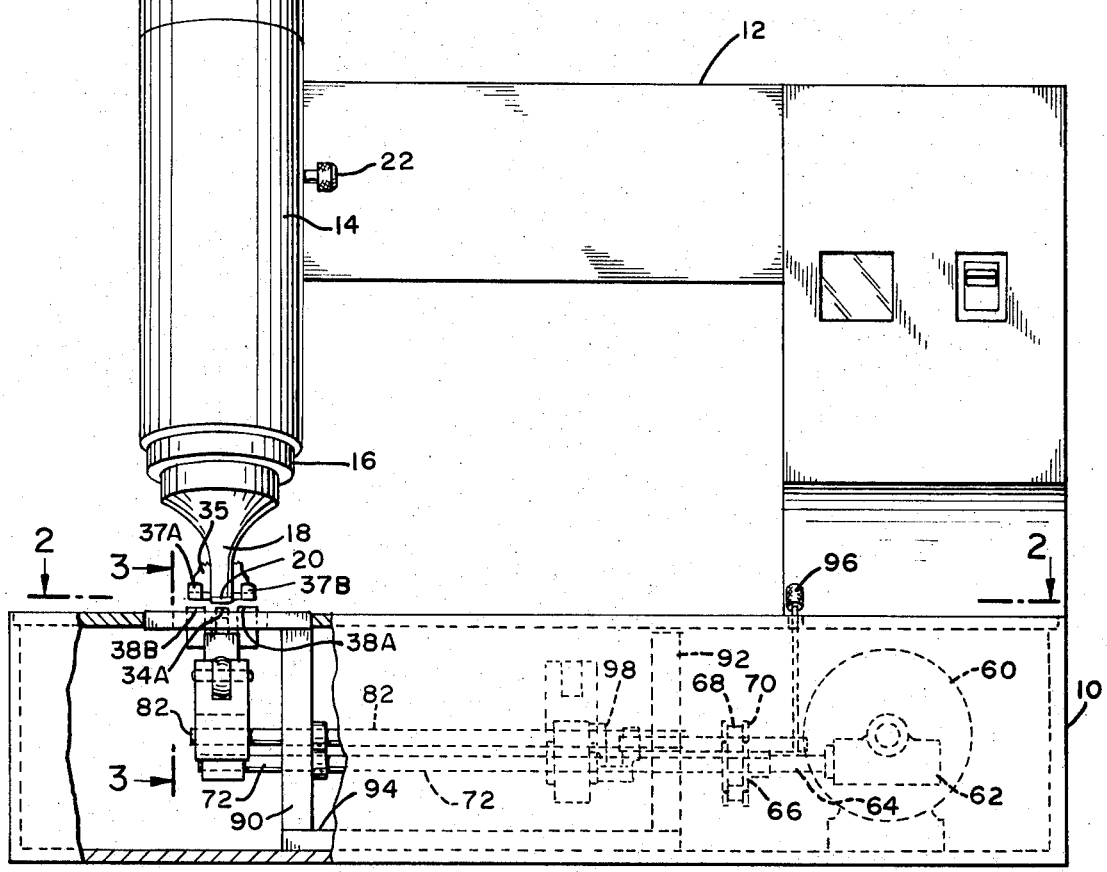
FIG. 1 is a front view of the ultrasonic seaming apparatus.
Figure 2:
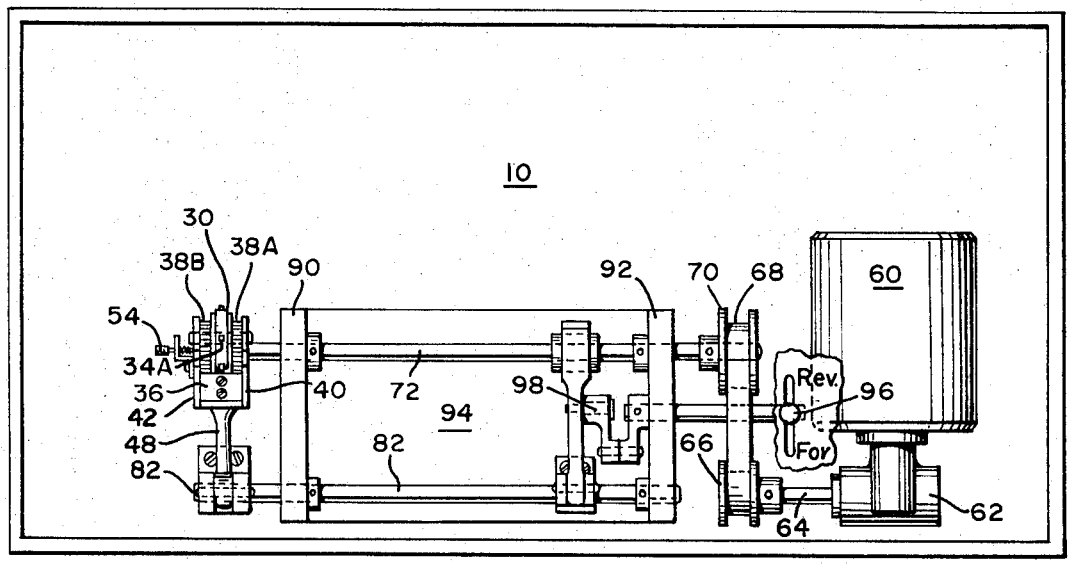
FIG. 2 is a plan view taken along line 2—2 in FIG. 1.

Referring now to the figures and FIGS. 1 and 2 in particular, there is shown a base 10 from which extends an L-shaped frame 12 which at the far end supports a sleeve 14 which, in turn, acts as a support for an electro-acoustic converter unit 16 housed in the sleeve. The converter unit includes piezoelectric or magnetostrictive transducing means for converting electrical high frequency energy applied to mechanical vibrations. The converter unit 16 is coupled to a tool 18, also called horn, resonator, mechanical amplitude transformer, etc., which receives the mechanical vibrations from the converter unit 16 and provides vibrations with amplified magnitude at the frontal surface 20. An adjusting knob 22 serves to set the minimum gap distance between the frontal surface 20 and the underlying anvil. The detailed construction of the base 10, frame 12, sleeve 14 and converter unit 16, etc. is described in the patent application of Edward G. Obeda supra. Also, as has been recited in the references, the generator producing electrical high frequency energy, now shown, most suitably provides an output signal at a predetermined frequency in the range from 20 to 60 kHz, causing the horn 18 to mechanically vibrate at a frequency which is known as the ultrasonic frequency range.

Figure 3:
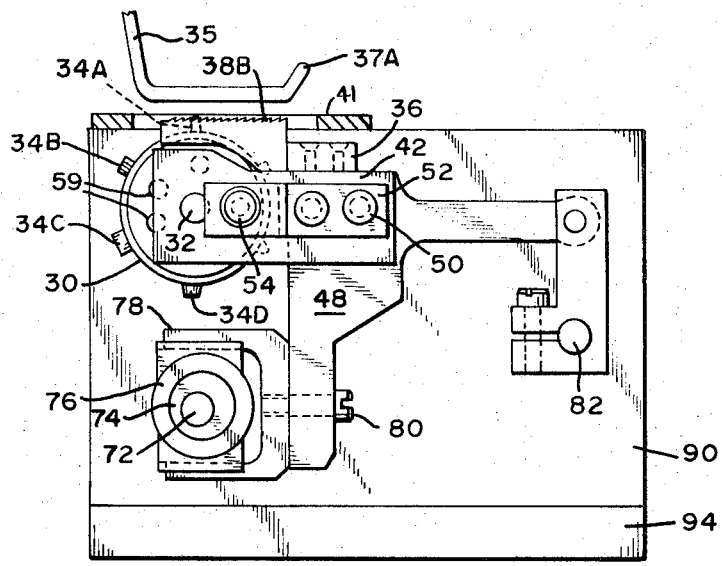
FIG. 3 is a sectional view along line 3—3 in FIG. 1.
Figure 4:
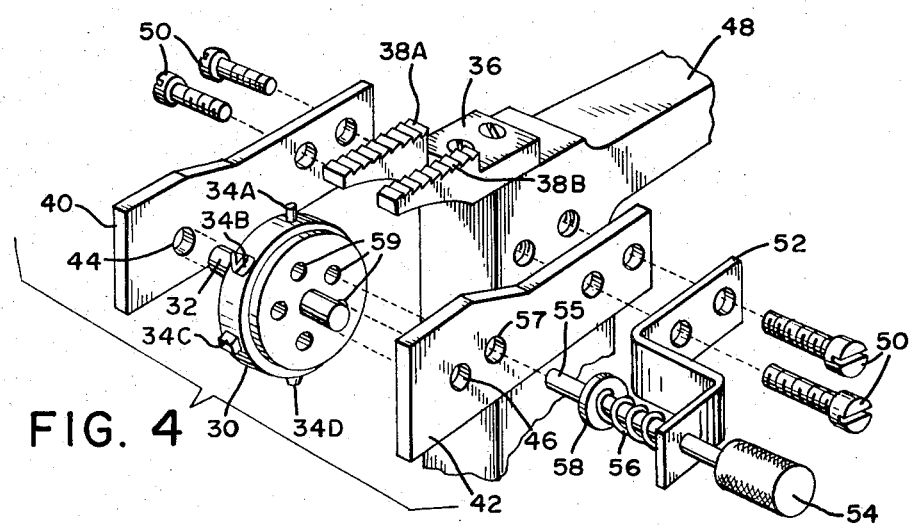
FIG. 4 is an exploded view of a preferred embodiment of the anvil means.

The frontal surface 20 of the horn 18 is opposed by an anvil means, see also FIGS. 3 and 4, which includes a disk or wheel 30 mounted upon a shaft 32. The disk 30 is provided on its peripheral surface with a plurality of spaced embossings, such as the different embossings identified by numerals 34A, 34B, 34C and 34D. The upper end of the disk 30 is received within the tines of a fork 36, each tine exhibiting a respective serrated transport surface 38A, 38B. The fork 36 is known in the sewing machine art as feed-dog. The disk 30 and shaft 32 are held in place by a set of side plates 40 and 42 which have respective apertures 44 and 46 for journaling therein the shaft 32. The feed-dog 36 is screw-fastened to a feed-bar 48 to which the side plates 40 and 42 are fastened by means of screws 50 which fit through respective mounting holes in the side plates 40 and 42 and engage threaded holes in the feed-bar 48. Also, an indexing means is provided which includes a bracket 52, a plunger 54, helical spring 56 and a spring support washer 58 affixed to the pin 55 of the plunger 54. The bracket 52 is juxtaposed with its mounting surface upon the side plate 42, causing the pin 55 of the plunger 54 to extend through the aperture 57 of the side plates 42 in order to engage selectively one of the apertures 59 provided in the side of the disk 30. By means of the plunger 54 a selected embossing 34A, 34B, 34C is indexed so as to become located opposite the frontal surface 20 of the horn 18 for causing the fused or welded spots on the workpiece to exhibit an appearance responsive to the selected embossing.

It will be apparent that changing the embossed pattern is readily accomplished by withdrawing the plunger 54 so as to release the pin 55 from the respectively engaged aperture 59, rotating the disk 30 until the desired pattern is located opposite the horn 18, and then securing the adjusted angular position of the disk by sliding the pin 55 into the respective aperture 59. The spring 56 retains the plunger 54 in its inward position.

Figure 5:
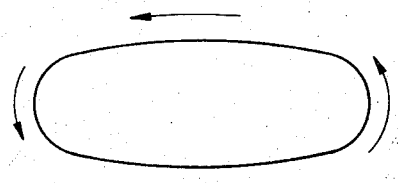
FIG. 5 is an illustration of the four-motion feed achieved.

The anvil structure (feed-dog 36 and disk 30) mounted to the feed-bar 48 undergoes four-motion feed which is a compound, somewhat elliptical motion, see FIG. 5, as is well known in the sewing machine art. This motion is described, for instance, in the book by Wilhelm Renters entitled "Der Naehmaschinen Fachmann" published by Bielefelder Verlagsanstalt, Bielefeld, Germany (1957), 8th edition; U.S. Pat. No. 2,787,232 F. Parry "Feeding Mechanisms for Sewing Machines" dated Apr. 2, 1957, or "Ingenious Mechanisms," Volume II, edited by Franklin D. Jones, The Industrial Press, New York, N.Y. (1957) pp. 439 to 442. The means for driving the anvil means in this mode of motion include a motor 60, located in the base 10, which has its speed controlled from a variable speed control device, not shown in this drawing. The motor is coupled to a speed reducer 62 which drives a shaft 64 upon which a pulley 66 is mounted. A flexible belt 68 transmits via pulley 70 rotation to a drive shaft 72. The drive shaft 72 at its other end is surrounded by an eccentric cam 74 which is fitted within a sleeve 76. A fork 78 engaging the sleeve 76 is mechanically coupled to the feed-bar 48 by screw 80. A second shaft 82, responsive to the rotation of shaft 72, undergoes rocking motion and also applies its motion to the feed-bar 48 so that the combination of the motions provided by shafts 72 and 82 results in the four-motion feed of the feed-dog 36. The shafts 72 and 82 are supported in plates 90 and 92 which are held to a base plate 94. A lever 96 through adjustable feed crank 98 adjusts the excursion of the feed-dog 36 from a maximum forward through zero to a maximum reverse feed, all as is well known from conventional sewing machines. In this manner the distance between fused spots along a weld seam is selectively adjustable. A bifurcated downwardly biassed presser foot 35 is mounted above the feed-dog 36 and includes a pair of tines 37A and 37B disposed above the respective serrated surfaces 38A and 38B. Numeral 41 identifies a stationary workpiece support plate which is known in the sewing machine art as throat plate.

Operation of the instant seaming apparatus may be visualized as follows: First, the seaming pattern is selected by indexing the disk 30 in such a manner that the desired pattern becomes located opposite the frontal surface of the horn. Next, the workpiece is fed underneath the presser foot 35 and between the frontal surface of the horn and the anvil means comprising in part the disk 30 and feed-dog 36. Responsive to energizing the motor 60 the workpiece is fed through the space between the disk and horn in stepped fashion, substantially in an identical manner as material is fed through a conventional sewing machine. The workpiece is urged into contact with the ultrasonically vibrating horn during the raised portion of the feed-dog motion, but is released from such engagement when the feed-dog moves downward. Hence, the peripheral portion of the disk 30 acts as anvil for the workpiece and horn, causing fusion of the workpiece material interposed between the frontal surface of the horn and the embossed pattern of the disk. The frontal surface of the horn is shaped to clear the tines of the presser foot, opposing only the workpiece engaging peripheral surface of the disk. The tines of the presser foot urge the workpiece into contact with the serrated surfaces to assist in the feeding of the workpiece, but no welding occurs in the workpiece portion disposed between the serrated feed-dog surfaces 38A, 38B and the tines 37A and 37B.

The quantity of welded spots per unit of length is adjusted by moving the lever 96 to the desired position, thereby providing for increased or decreased excursion of the feed-dog 36 and anvil disk 30. When setting the lever 96 to its neutral position between forward and reverse feed motion, the workpiece can be guided manually through the welding station in a free-form motion to produce almost any desired configuration of the seam, for instance a seam in the outline of figure "8," or written letters, numerals, symbols or emblems.

It will be apparent to those skilled in the art that the present anvil construction provides for a quick and relatively simple weld pattern change and also for a variable weld density pattern. Moreover, the particular anvil construction revealed cyclically releases the workpiece from engagement with the horn, thereby preventing the bunching up of material in front of the horn experienced with certain fabrics. These features, in combination, contribute to a significant improvement and advance in the art of ultrasonic seaming apparatus.

What is claimed is:

1. In an ultrasonic seaming apparatus the combination of:

a converter unit adapted to receive electrical high frequency energy and in response thereto provide vibrations at an ultrasonic frequency;

a horn coupled to said converter unit for receiving said vibrations and providing vibrations to a workpiece in contact with the frontal surface of said horn;

an anvil disk having a plurality of peripherally disposed workpiece engaging surfaces;

means mounting said anvil disk relative to said horn to cause one of said peripheral surfaces to be located opposite said frontal surface and forming a gap therewith through which a workpiece can be fed;

indexing means cooperatively associated with said anvil disk for adjusting the rotational position of said anvil disk relative to said frontal surface to cause a selected one of said peripheral surfaces to be disposed opposite said frontal surface, and means coupled to said means mounting said disk for causing said anvil disk to undergo four-motion feed relative to said frontal surface for feeding the workpiece in stepped motion past said frontal surface and cyclically causing during a portion of said motion the selected workpiece engaging surface to urge a workpiece disposed between said frontal surface and said anvil disk into contact with said frontal surface for receiving said vibrations.

2. In an ultrasonic seaming apparatus as set forth in claim 1, and each of said peripherally disposed surfaces including ornamental embossing.

3. In an ultrasonic seaming apparatus as set forth in claim 1, said indexing means including apertures in said disk, and plunger means adapted to selectively engage one of said apertures.

4. In an ultrasonic seaming apparatus the combination of:

- a converter unit adapted to receive electrical high frequency energy and in response thereto provide vibrations at an ultrasonic frequency;
- a horn coupled to said converter unit for receiving such vibrations and providing the vibrations to a workpiece in contact with the frontal surface of said horn;
- an anvil means which includes a feed-dog supporting a fork having workpiece transporting surfaces and an anvil disk disposed substantially centrally with respect to the tines of said fork and opposite said frontal surface for causing a portion of the periphery of said disk to act as anvil for a workpiece interposed between said anvil means and said frontal surface;
- a plurality of embossings disposed on the periphery of said disk;
- indexing means cooperatively associated with said disk and said feed-dog for selectively positioning a respective embossing opposite said frontal surface for causing such selected embossing to be impressed upon the workpiece responsive to said frontal surface transferring ultrasonic vibrations to the workpiece;
- drive means coupled for causing said feed-dog to undergo four-motion feed for feeding the workpiece in stepped motion between said anvil means and said horn and causing said workpiece to be urged into contact with said frontal surface during a portion of such motion, and
- means coupled to said drive means for adjusting the excursion of said motion.

5. In an ultrasonic seaming apparatus as set forth in claim 4, said means for adjusting the excursion of said motion adapted to cause the workpiece to be fed in two directions past said frontal surface.

6. In an ultrasonic seaming apparatus as set forth in claim 4, said means for adjusting the excursion of said motion adapted to be set to a position in which said feed-dog causes no substantial feed of the workpiece past said frontal surface.

7. In an ultrasonic seaming apparatus as set forth in claim 4, and means mounting said feed-dog to a feed-bar; said anvil disk being mounted upon a shaft; bracket means attached to said feed-bar and supporting shaft for causing said disk to be in alignment with said feed-dog; and said indexing means being supported by said feed-bar and engaging the side of said anvil disk for retaining said disk in an indexed position.

* * * * *